(12) United States Patent
Yabu et al.

(10) Patent No.: US 6,490,310 B1
(45) Date of Patent: Dec. 3, 2002

(54) LASER DISCHARGE ELECTRODES WITH CURRENT RETURN PLATE STRUCTURE

(75) Inventors: Takayuki Yabu, Hiratsuka (JP); Takanobu Ishihara, Oyama (JP); Takashi Matsunaga, Ninomiya-machi (JP); Yasufumi Kawasuji, Oyama (JP)

(73) Assignee: Komatsu Ltd., Tokyo (JP)

( * ) Notice: Subject to any disclaimer, the term of this patent is extended or adjusted under 35 U.S.C. 154(b) by 30 days.

(21) Appl. No.: 09/658,920

(22) Filed: Sep. 11, 2000

(51) Int. Cl.[7] ............................ H01S 3/097; H01S 3/22; H01S 3/223
(52) U.S. Cl. ............................................ 372/87; 372/57
(58) Field of Search ................................ 372/57, 59, 87

(56) References Cited

U.S. PATENT DOCUMENTS

| | | | | |
|---|---|---|---|---|
| 5,247,534 A | * | 9/1993 | Muller-Horsche | 372/58 |
| 5,923,639 A | * | 7/1999 | Ohmi et al. | 372/57 |
| 5,978,405 A | * | 11/1999 | Juhasz et al. | 372/57 |
| 6,052,402 A | * | 4/2000 | Murray et al. | 372/87 |

FOREIGN PATENT DOCUMENTS

JP          1-268078       10/1989

* cited by examiner

*Primary Examiner*—Paul Ip
*Assistant Examiner*—Davienne Monbleau
(74) *Attorney, Agent, or Firm*—Armstrong, Westerman & Westerman

(57) ABSTRACT

A discharge electrode for a laser device allowing return plates to be easily attached/detached and a laser device with the discharge electrode are provided. To this end, structure in which a pair of an anode (5A) and a cathode (5B), provided facing each other inside a laser chamber (2) sealing in laser gases, for discharging electricity to excite the laser gases flowing through a space between them, thereby oscillating a laser beam, a conductive anode base (6) for holding the anode (5A), an insulating cathode base (8) for holding the cathode (5B), and a plurality of return plates (9B) for electrically connecting the anode base (6) and the laser chamber (2) and supplying an electric current to the anode (5A) are provided, and in which upper portions and lower portions of the return plates (9B) are connected respectively with an upper fixed plate (9A) and a lower fixed plate (9C), is given.

4 Claims, 6 Drawing Sheets

LASER DISCHARGE ELECTRODES WITH CURRENT RETURN PLATE STRUCTURE

TECHNICAL FIELD

The present invention relates to a laser device, and more particularly to connection structure of discharge electrodes in a laser device and a laser device including the discharge electrodes.

BACKGROUND ART

A laser device which discharges electricity between discharge electrodes to excite a laser medium, thereby oscillating a laser beam has been hitherto known and is shown, for example, in Japanese Patent Laid-open No. 1-268078 Official Gazette. FIG. 10 shows the structure of an excimer laser device disclosed in the aforesaid Official Gazette, and FIG. 11 shows the structure of discharge electrodes in the excimer laser device disclosed in the aforesaid Official Gazette.

In FIG. 10 and FIG. 11, an excimer laser device 101 includes a laser chamber 102 sealing in a laser medium such as laser gases. Inside the laser chamber 102, a pair of discharge electrodes 105A and 105B composed of an anode 105A and a cathode 105B are disposed facing each other. The anode 105A is fixed to a conductive anode base 106, and the cathode 105B is fixed to an insulating cathode base 108.

A pair of preionization electrodes 118 and 118 are disposed facing each other on both sides of the discharge electrodes 105A and 105B, and a high-voltage current is supplied from a high voltage power supply though a preionization circuit and a current introducing terminal which are not illustrated, thereby performing preionization.

Inside the laser chamber 102, a cross flow fan 114 for sending laser gases into a space between the discharge electrodes 105A and 105B and a heat exchanger 103 for cooling the laser gases heated by electric discharge are disposed at predetermined positions. Electricity is discharged between the anode 105A and the cathode 105B to excite laser gases, shown by the arrows G, flowing through the space between the anode 105A and the cathode 105B, thereby oscillating a laser beam.

The anode base 106 and the cathode base 108 are supported by support posts 110 with a predetermined space between them. The anode base 106 and the laser chamber 102 are electrically connected with a plurality of return plates 109 arranged at predetermined intervals in the longitudinal direction of the discharge electrodes 105A and 105B. It should be mentioned that connection points of the return plates 109 and the laser chamber 102 are not clearly illustrated in the aforesaid Official Gazette. Each of the return plates 109 is made of a conductive plate-shaped member, and disposed parallel to the gas flow G so that a portion 109A with a thin plate thickness faces to the upper reaches and the lower reaches of the gas flow G with respect to the gas flow.

The prior art disclosed in the aforesaid Japanese Patent Laid-open No. 1-268078 Official Gazette, however, has the following problems.

Namely, in the prior art, in order to smoothly supply an electric current to the whole area in the longitudinal direction of the anode 105A to suitably discharge electricity, the plurality of return plates 109 are provided in the whole area in the longitudinal direction. When the excimer laser device 101 is assembled, the plurality of return plates 109 need to be attached one by one so as to connect the anode base 106 and the laser chamber 102, which requires a lot of trouble over assembling.

Furthermore, the discharge electrodes 105A and 105B become worn-out as the result of electric discharge, and hence they need to be replaced regularly. Every time the discharge electrodes 105A and 105B are replaced as above, the plurality of return plates 109 need to be attached/detached, which takes a lot of time and labor.

SUMMARY OF THE INVENTION

The present invention is made to solve the problems in the aforesaid art, and its object is to provide a discharge electrode for a laser device allowing return plates to be easily attached/detached and a laser device with the discharge electrode.

To attain the aforesaid object, a discharge electrode for a laser device according to the present invention has structure in which a pair of an anode and a cathode, provided facing each other inside a laser chamber sealing in laser gases, for discharging electricity to excite the laser gases flowing through a space between them, thereby oscillating a laser beam, a conductive anode base for holding the anode, an insulating cathode base for holding the cathode, and a plurality of return plates for electrically connecting the anode base and the laser chamber and supplying an electric current to the anode are provided, and in which upper portions and lower portions of the return plates are connected respectively with an upper fixed plate and a lower fixed plate.

Furthermore, a laser device according to the present invention has structure in which a pair of an anode and a cathode, provided facing each other inside a laser chamber sealing in laser gases, for discharging electricity to excite the laser gases flowing through a space between them, thereby oscillating a laser beam, a conductive anode base for holding the anode, an insulating cathode base for holding the cathode, and a plurality of return plates for electrically connecting the anode base and the laser chamber and supplying an electric current to the anode are provided, and in which upper portions and lower portions of the return plates are connected respectively with an upper fixed plate and a lower fixed plate.

According to the aforesaid structure, the plurality of return plates are integrated at the upper and lower portions thereof to be formed into a unit. Thereby, when the return plates are attached/detached, each unit of return plates may be attached/detached, which saves a lot of time and labor compared with a case where a plurality of return plates are attached.

Moreover, the discharge electrode for the laser device and the laser device may each have structure in which the return plates are disposed almost parallel to gas flow of the laser gases flowing through the space between the discharge electrodes.

According to the aforesaid structure, the return plates rectify the gas flow of the laser gases, thereby making the flow of the laser gases smooth and increasing flow velocity. As a result, electric discharge is stabilized, and the power of the laser beam is raised.

BEST MODE FOR CARRYING OUT THE INVENTION

Preferred embodiments according to the present invention will be explained in detail below with reference to the drawings.

Figure 1:
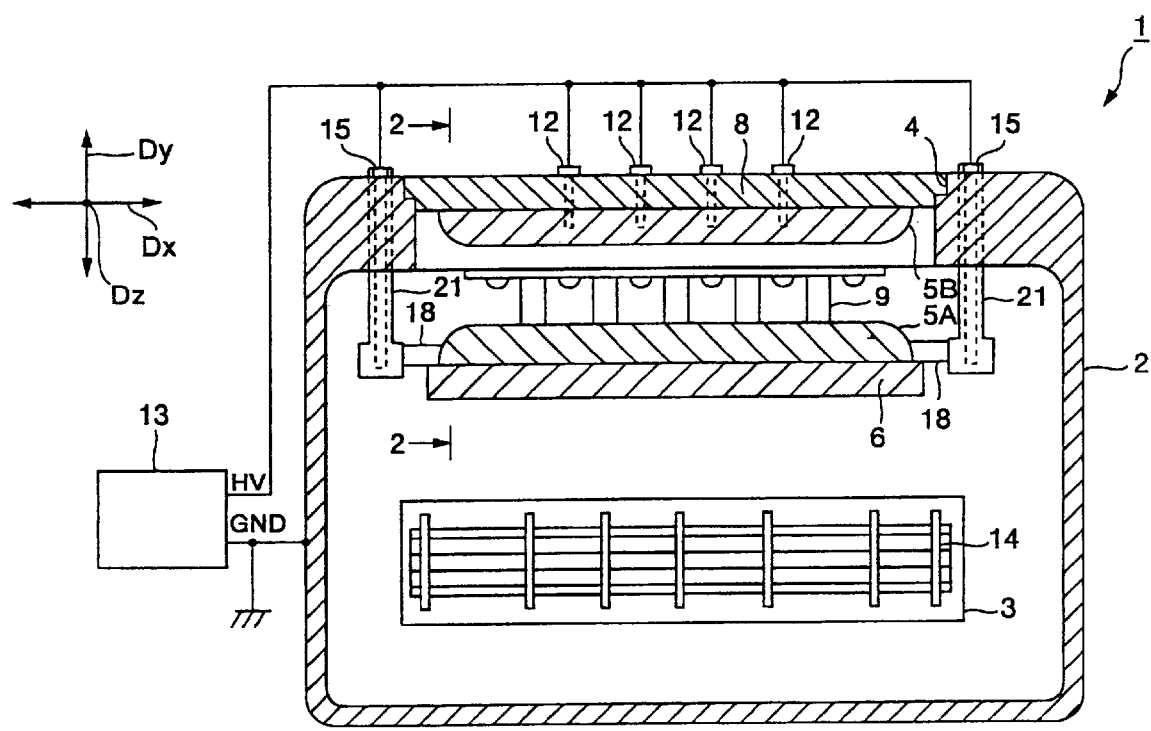
FIG. 1 is an explanatory view showing the structure of an excimer laser device according to a first embodiment of the present invention.
Figure 2:
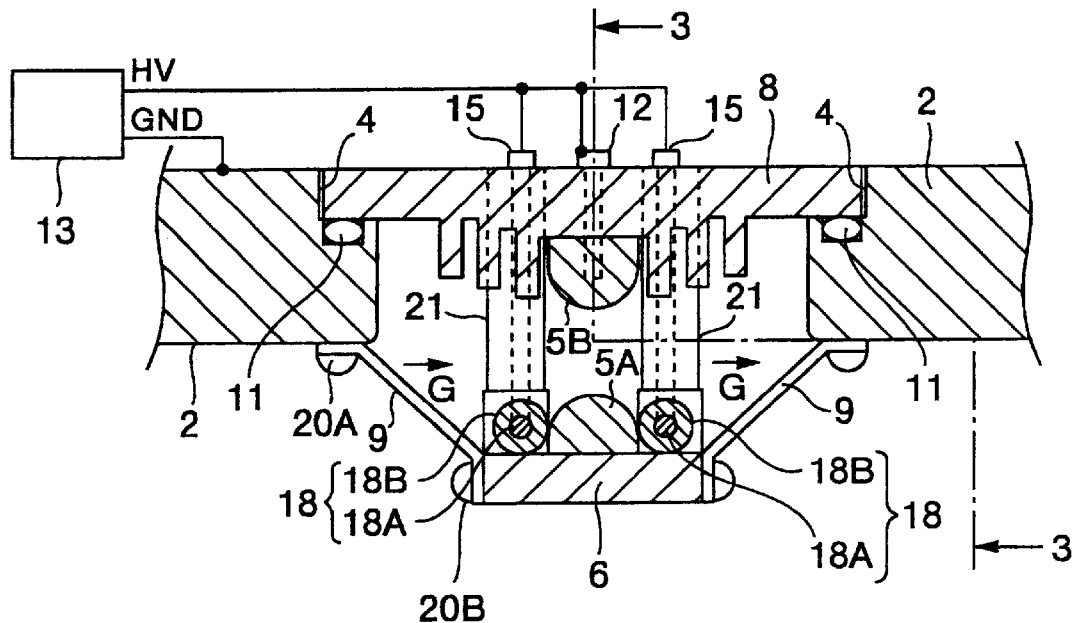
FIG. 2 is a sectional view taken along the line 2—2 in FIG. 1.
Figure 3:
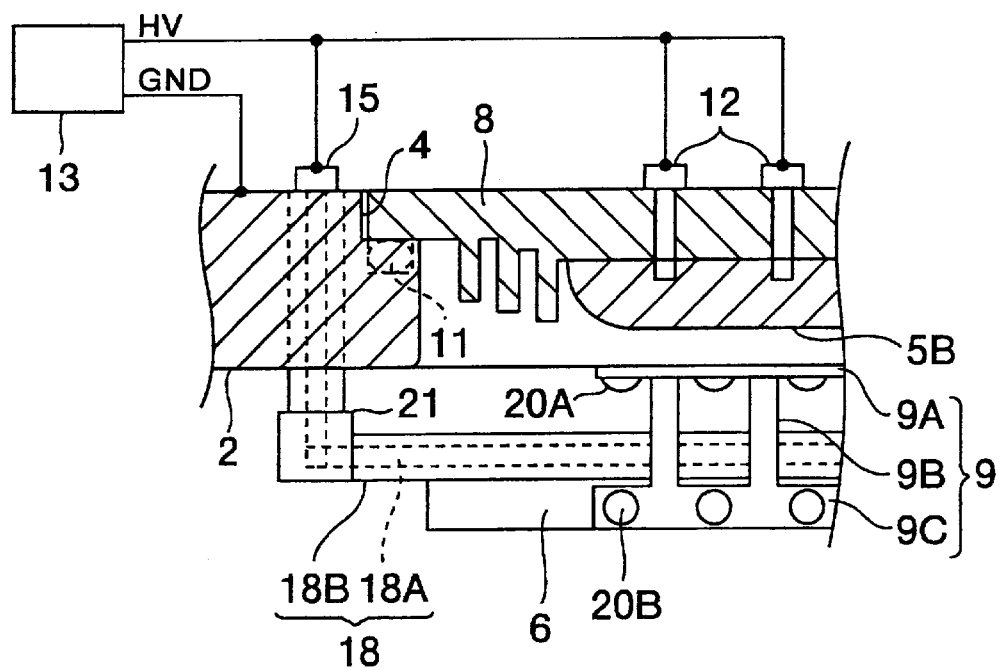
FIG. 3 is a sectional view taken along the line 3—3 in FIG. 2.

FIG. 1 shows the schematic structure of an excimer laser device 1 according to a first embodiment, FIG. 2 is a sectional view taken along the line 2—2 in FIG. 1, and FIG. 3 is a sectional view taken along the line 3—3 in FIG. 2.

In FIG. 1 to FIG. 3, the excimer laser device 1 includes a laser chamber 2 sealing in a laser medium such as laser gases. A pair of discharge electrodes 5A and 5B composed of an anode 5A and a cathode 5B are disposed facing each other with a predetermined space between them at predetermined positions inside the laser chamber 2. In the excimer laser device 1, a high-voltage current is applied to a space between the discharge electrodes 5A and 5B from a high voltage power supply 13 via a discharge circuit not illustrated to discharge electricity, whereby a laser medium is excited to oscillate a laser beam.

In the following explanation, a direction (a direction vertical to the paper surface in FIG. 1) which is perpendicular to both of a longitudinal direction Dx of the discharge electrodes 5A and 5B (a right-left direction in FIG. 1) and a facing direction Dy in which the discharge electrodes 5A and 5B face each other (a top-bottom direction in FIG. 1) is referred to as a depth direction Dz.

Inside the laser chamber 2, a cross flow fan 14 for sending laser gases into the space between the discharge electrodes 5A and 5B and a heat exchanger 3 for cooling the laser gases heated by electric discharge in the space between the discharge electrodes 5A and 5B are disposed at predetermined positions. As shown in FIG. 2, the laser gases are passed through the space between the discharge electrodes 5A and 5B in the depth direction Dz by the cross flow fan 14.

A chamber opening 4 is provided at the upper portion of the laser chamber 2, and the chamber opening 4 is sealed up with a cathode base 8 made of an insulating material such as a ceramic or the like. An O-ring 11 is fitted into a space between the laser chamber 2 and the cathode base 8 to seal in the laser gases. The cathode 5B is fixed to the cathode base 8, and the cathode 5B and the laser chamber 2 are electrically insulated from each other by the cathode base 8.

On the top of the cathode base 8, a plurality of high-voltage feeder rods 12 penetrating through the cathode base 8 and reaching to the cathode 5B are disposed at predetermined intervals in the longitudinal direction Dx. The high-voltage feeder rods 12 are connected to a high-voltage side HV of the high voltage power supply 13 via the discharge circuit not illustrated, whereby a high-voltage current for electric discharge is supplied to the cathode 5B. Spaces between the high-voltage feeder rods 12 and the cathode base 8 are sealed with O-rings not illustrated.

Preionization electrodes 18 and 18 are disposed along the longitudinal direction Dx on both sides in the depth direction Dz of the anode 5A. The preionization electrode 18 includes a conductive material portion 18A and an insulating material portion 18B covering the outer periphery of the conductive material portion 18A. Feeder insulating members 21 each made of an insulating material penetrate through both end portions in the longitudinal direction Dx of the laser chamber 2, and an auxiliary feeder rod 15 made of a conductive material penetrates through the inside of the feeder insulating member 21. Both a space between the laser chamber 2 and the feeder insulating member 21 and a space between the feeder insulating member 21 and the auxiliary feeder rod 15 are sealed with O-rings not illustrated.

The conductive material portion 18A of the preionization electrode 18 and the auxiliary feeder rod 15 are electrically connected inside the feeder insulating member 21. The high-voltage side HV of the high-voltage power supply 13 is connected to the auxiliary feeder rod 15 via an preionization circuit not illustrated and supplies a high-voltage current to the preionization electrode 18.

The upper portion of a return unit 9 made of a conductive material is fixed to the lower portion of the inner wall near the chamber opening 4 of the laser chamber 2 with a plurality of bolts 20A. An anode base 6 made of a conductive material is fixed to the lower portion of the return unit 9 with bolts 20B, and the anode 5A is mounted on the top of the anode base 6.

Figure 4:
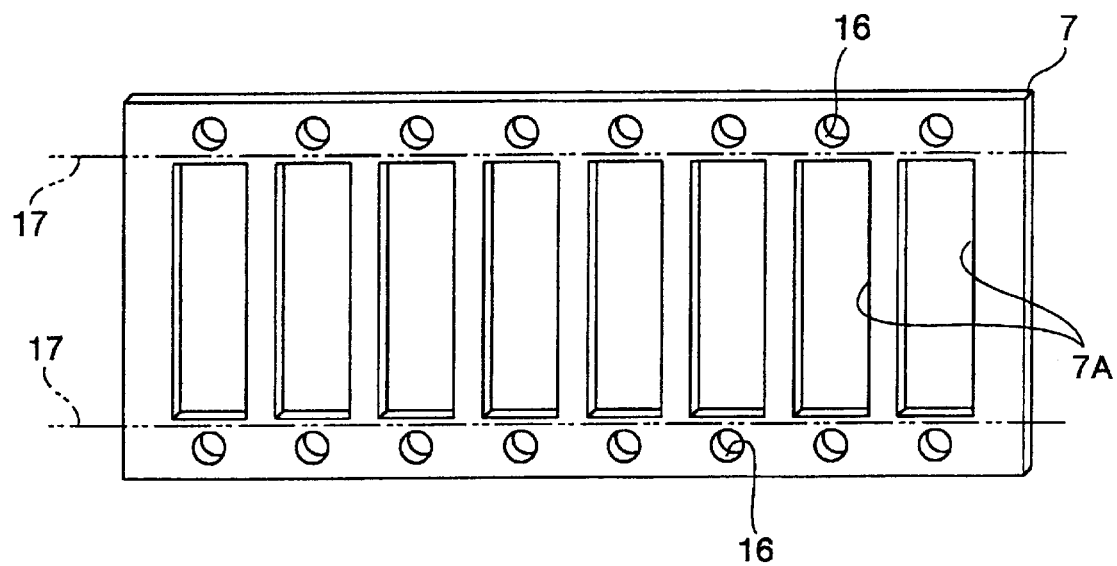
FIG. 4 is an explanatory view of a manufacturing method of return plates according to the first embodiment.
Figure 5:
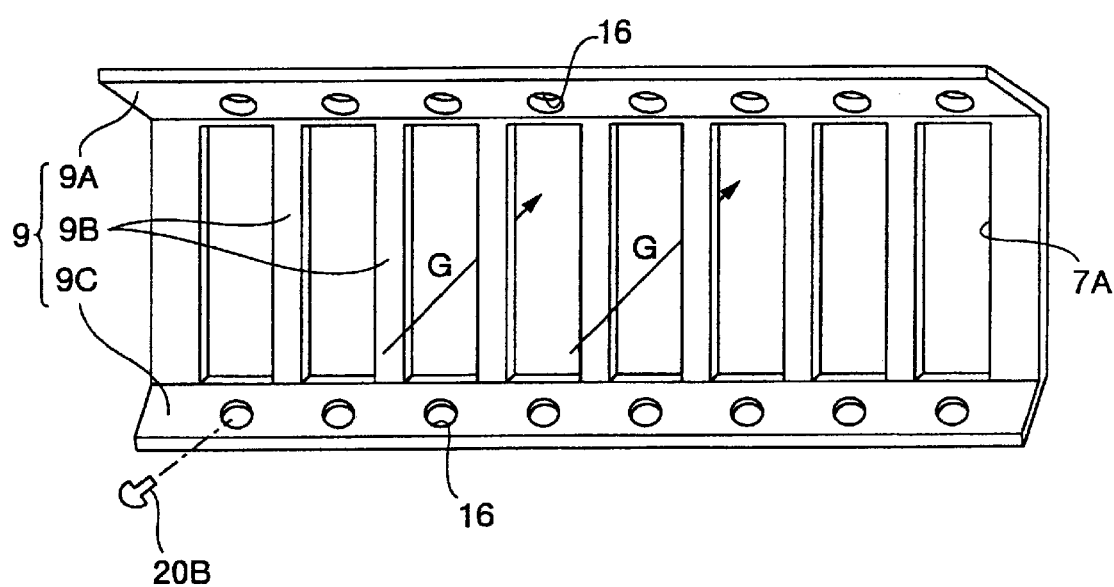
FIG. 5 is a perspective view of the return plates according to the first embodiment.

FIG. 4 and FIG. 5 show the structure of the return unit 9. The return unit 9 is formed by punching a plurality of square openings 7A in a flat plate 7 made of a conductive material at predetermined intervals. A plurality of bolt holes 16 and 16 for fixing the return unit 9 are provided respectively in the upper and lower portions of the flat plate 7. As shown in FIG. 5, the return unit 9 is formed by bending the flat plate 7 at a predetermined angle at a bending line 17 shown by the two-dot chain line in FIG. 4.

Incidentally, FIG. 5 is a diagram of the return unit 9 disposed upstream of the laser gases with respect to the discharge electrodes 5A and 5B as seen from the upstream side of the laser gases with respect to the discharge electrodes 5A and 5B. Namely, the discharge electrode 5A and 5B not illustrated are disposed across the return unit 9 in FIG. 5.

Specifically, the return unit 9 includes an upper fixed plate 9A to be fixed to the laser chamber 2, a lower fixed plate 9C to be fixed to the anode base 6, and return plates 9B laid between the upper fixed plate 9A and the lower fixed plate 9C. It should be mentioned that nickel-plated copper is desirable as the material of the flat plate.

The upper fixed plate 9A of the return unit 9 is fixed to the laser chamber 2 through the bolt holes 16 with the bolts 20A. The lower fixed plate 9C is fixed to the anode base 6 through the bolt holes 16 with the bolts 20A. The laser chamber 2 is connected to a grounding side GND of the high-voltage power supply 13 via the discharge circuit not illustrated, whereby the anode 5A has the same electric potential as the laser chamber 2 via the return plates 9B. Thereby, electric discharge occurs between the cathode 5B connected to the high-voltage side HV and the anode 5A connected to the grounding side GND. At this time, the laser gases pass through the square openings 7A formed between the return plates 9B, and then the space between the discharge electrodes 5A and 5B.

As explained above, according to this embodiment, the return unit 9 electrically connecting the anode 5A to the grounding side GND is formed integrally, which saves the trouble of assembling the return unit 9, compared with a prior art in which a plurality of return plates 109 are attached individually to the laser chamber 2 and the anode base 6. Moreover, the number of parts decreases, which saves the trouble of managing parts, compared with a case where the number of the plural small return plates 109 need to be managed so as not to be miscounted.

Figure 6:
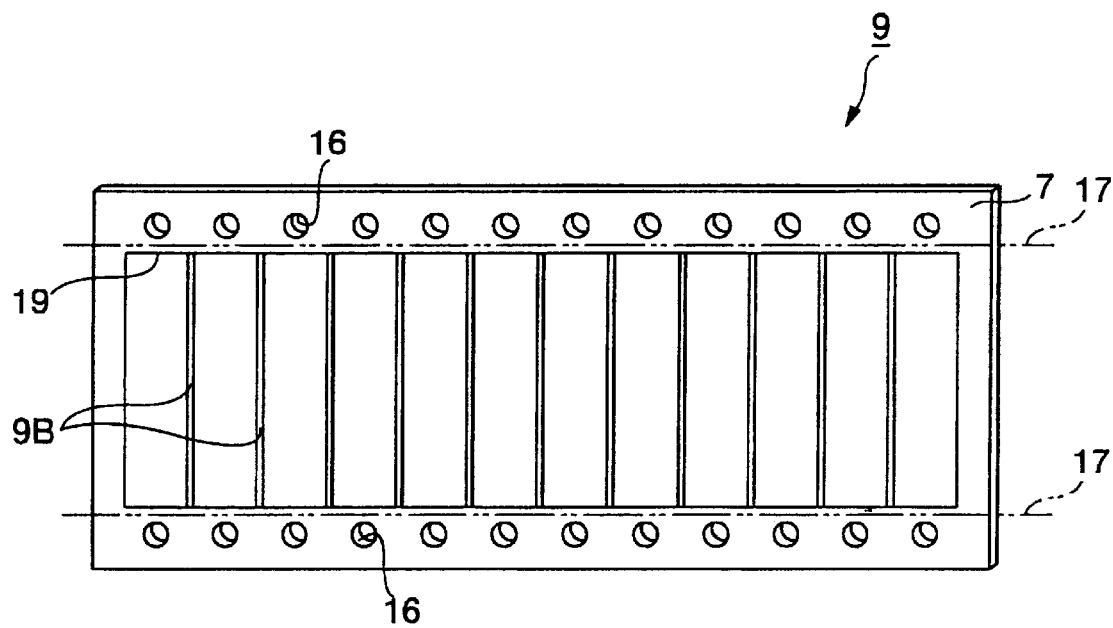
FIG. 6 is a perspective view showing another structural example of the return plates according to the first embodiment.

Incidentally, although it is explained that the return unit 9 according to the first embodiment is formed by punching the square openings 7A in the flat plate 7, the return unit 9 is not limited to the above example. FIG. 6 shows another structural example of the return unit 9 according to the first embodiment. As shown in FIG. 6, a square large opening 19 is provided leaving only the outer peripheral portion of the flat plate 7, and the upper end portion and the lower end portion of the large opening 19 are connected with the return plates 9B by means such as welding. The return unit 9 may be formed by bending the flat plate 7 at the bending line 17 as shown in FIG. 5.

In this case, for example, if the return plates 9B are each formed into a stream line shape, the turbulence of the flow of the laser gases by the return plates 9B reduces, thereby increasing the flow velocity of the laser gases flowing through the space between the discharge electrodes 5A and 5B to stabilize electric discharge.

Next, a second embodiment of the present invention will be explained.

Figure 7:
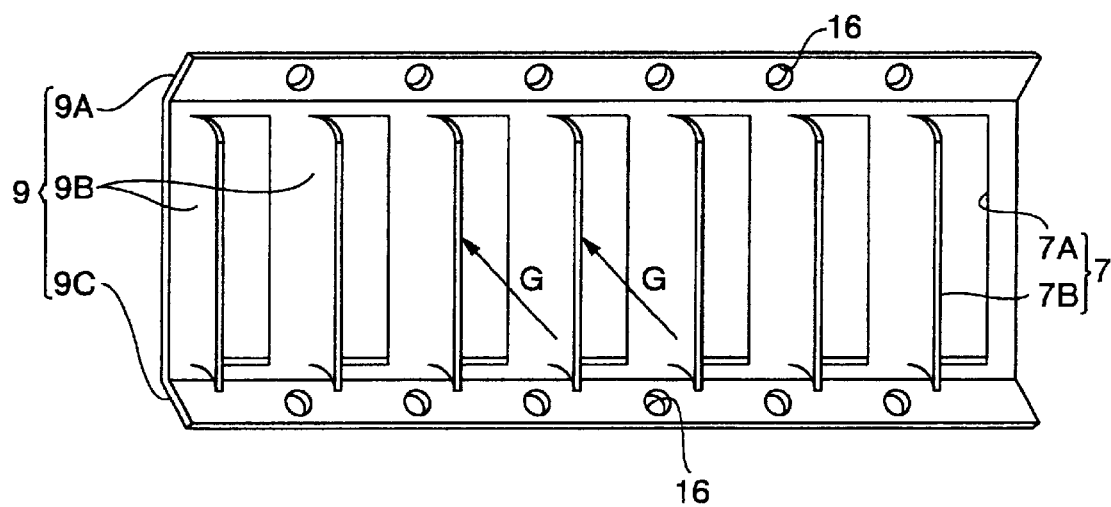
FIG. 7 is a perspective view of return plates according to a second embodiment of the present invention.

FIG. 7 shows the return unit 9 according to the second embodiment. As shown in FIG. 7, in the return unit 9, the openings 7A are provided by punching them in the flat plate 7 from one side, and portions of the flat plate 7 are lifted up until they become almost perpendicular to the flat plate 7, thereby forming current plates 7B.

This saves the trouble of assembling return unit 9, compared with the prior art in which the plurality of the return plates 109 are attached individually to the laser chamber 2 and the anode base 6. Moreover, the number of parts decreases, which saves the trouble of managing parts, compared with a case where the number of the plural small return plates 109 need to be managed so as not to be miscounted.

The current plates 7B rectify the flow G of the laser gases so that the flow G is almost perpendicular to longitudinal direction Dx of the discharge electrodes 5A and 5B, whereby laser gases deteriorated by electric discharge are removed smoothly from the space between the discharge electrodes 5A and 5B, thus stabilizing electric discharge.

Figure 8:
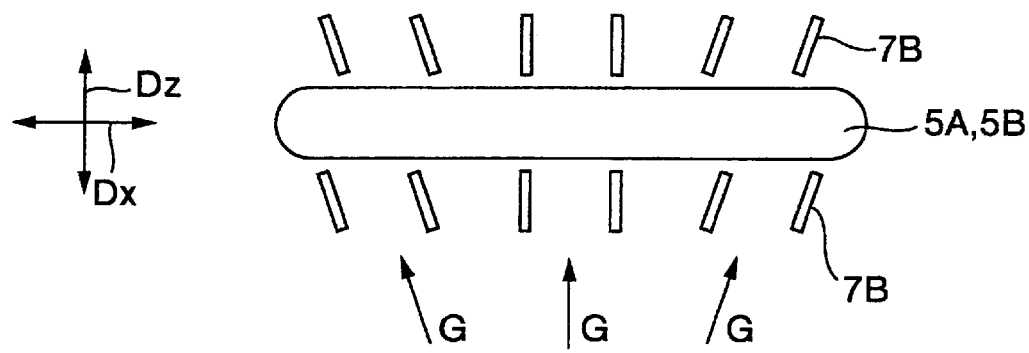
FIG. 8 is an explanatory view of discharge electrodes seen from above according to the second embodiment.

Incidentally, as shown in FIG. 8, at both end portions in the longitudinal direction Dx of the discharge electrodes 5A and 5B, the current plates 7B may be disposed to incline outward in a direction from the upper reaches to the lower reaches of the laser gases instead of being disposed almost perpendicularly. FIG. 8 is an explanatory view of the discharge electrodes 5A and 5B in plan view from above. The flow C of the laser gases discharged from the cross flow fan 14 at the aforesaid both end portions goes from the central portion toward the end portions as shown in FIG. 8. Therefore, the flow velocity of the laser gases is increased more by disposing the return plates 9B along the flow G rather than by forcibly rectifying the flow G perpendicularly to the longitudinal direction Dx.

Figure 9:
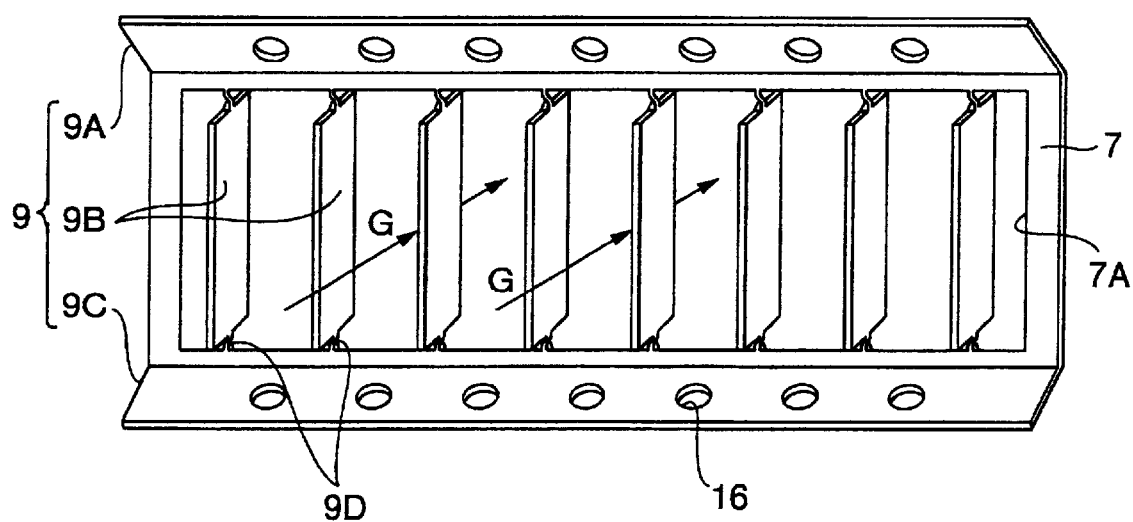
FIG. 9 is a perspective view showing another structural example of the return plates according to the second embodiment.
Figure 10:
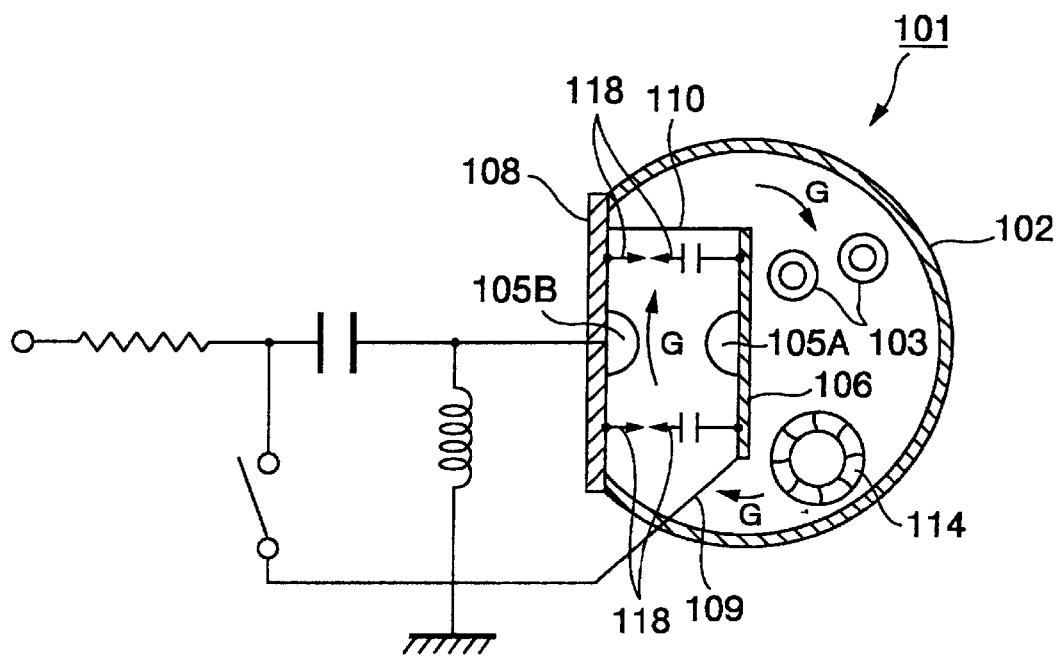
FIG. 10 is an explanatory view showing the structure of a laser device according to a prior art.
Figure 11:
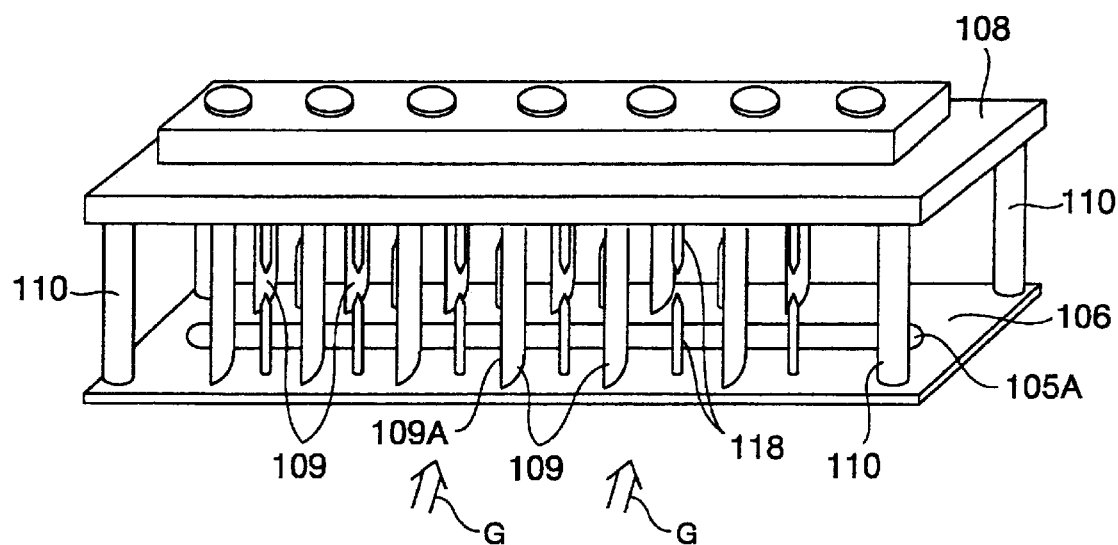
FIG. 11 is a perspective view showing the structure of discharge electrodes according to the prior art.

FIG. 9 shows another structural example of the return unit 9 according to the second embodiment. As shown in FIG. 9, an opening is punched in the flat plate 7, leaving connecting portions 9D, and twisting is performed so that the return plates 9B are almost perpendicular to the flat plate 7. Thus, the trouble of assembling the return unit 9 and the trouble of managing parts are saved similarly. The return plates 9B, as current plates, rectify the laser gases, thereby stabilizing electric discharge similarly.

Although it is explained in the aforesaid respective embodiments that the return unit 9 is formed integrally along the longitudinal direction Dx, the return unit 9, for example, may be divided into two portions with the center of the discharge electrodes 5A and 5B as a boundary, and moreover may be divided into multiple portions.

What is claimed is:

1. A discharge electrode for a laser device, comprising:
a pair of an anode and a cathode, provided facing each other inside a laser chamber sealing in laser gases, for discharging electricity to excite the laser gases flowing through a space between them, thereby oscillating a laser beam;
a conductive anode base for holding said anode;
an insulating cathode base for holding said cathode; and
a plurality of return plates for electrically connecting said anode base and said laser chamber and supplying an electric current to said anode,
wherein upper portions and lower portions of said return plates are connected respectively with an upper fixed plate and a lower fixed plate to form an integrated unit containing said plurality of return plates.

2. The discharge electrode for the laser device in accordance with claim 1,
wherein said return plates are disposed almost parallel to gas flow of the laser gases flowing through the space between said anode and said cathode.

3. A laser device, comprising:
a pair of an anode and a cathode, provided facing each other inside a laser chamber sealing in laser gases, for discharging electricity to excite the laser gases flowing through a space between them, thereby oscillating a laser beam;
a conductive anode base for holding said anode;
an insulating cathode base for holding said cathode; and
a plurality of return plates for electrically connecting said anode base and said laser chamber and supplying an electric current to said anode,
wherein upper portions and lower portions of said return plates are connected respectively with an upper fixed plate and a lower fixed plate to form an integrated unit containing said plurality of return plates,
wherein said upper fixed plate is fixed to said laser chamber, and
wherein said lower fixed plate is fixed to said anode base.

4. The laser device in accordance with claim 3,
wherein said return plates are disposed almost parallel to gas flow of the laser gases flowing through the space between said anode and said cathode.

* * * * *